Aug. 10, 1965     A. H. YOUMANS     3,200,251
APPARATUS FOR NEUTRON-NEUTRON WELL LOGGING
Filed July 7, 1961     3 Sheets-Sheet 1

INVENTOR.
ARTHUR H. YOUMANS
BY
*E. F. Bard*
ATTORNEY

INVENTOR.
ARTHUR H. YOUMANS
BY E. F. Bard
ATTORNEY

INVENTOR.
ARTHUR H. YOUMANS
BY
E. F. Bard
ATTORNEY 3,200,251
APPARATUS FOR NEUTRON-NEUTRON
WELL LOGGING
Arthur H. Youmans, Houston, Tex., assignor to Well Surveys, Inc., a corporation of Delaware
Filed July 7, 1961, Ser. No. 122,538
9 Claims. (Cl. 250—83.1)

This invention relates to the art of well logging by means of neutron irradiation of sub-surface substances traversed by a borehole, and more particularly relates to methods and apparatus for making corelative thermal and epithermal neutron logs of such substances during a single trip through the borehole.

It is well known that oil and gas, and other related natural substances generally included within the scope of the generic term "petroleum," are usually found in subsurface earth and rock strata. It is also well known that recovery of these substances is generally achieved by drilling a borehole in the earth and into, or through, the various strata or formations suspected to contain such oil or other petroleum substances. Of course, it is obviously difficult to determine the character of the various formations insofar as oil-bearing possibilities are concerned, since the formations of interest often lie thousands of feet below the surface of the earth, and since access thereto can only be had through a hole which usually measures but a few inches in diameter.

Various methods and apparatus for vertically surveying or "logging" the borehole have been devised, from time to time, for the purpose of determining one or more characteristics of the traversed substances such as electrical resistivity, density, etc. Based on the data obtained by means of one or more of these techniques conclusions are more or less tentatively reached, by means of empirical formulae, analogous reasoning, and sometimes "educated" guessing, as to the existence of petroleum in profitable quantities in particular formations. Although no well logging techniques currently exist which provide a direct indication of the presence of petroleum, careful measurements of certain characteristics can often serve to eliminate a particular formation from further consideration. For example, it is now well known that petroleum does not exist in these formations in the form of lakes or rivers notwithstanding the common use of the term "pool" in the industry. On the contrary, the sought-for substances exist in a finely divided state in the small pockets or cavities between the particles of the materials which compose the formation. Of course, the more porous the formation the larger the cavities, and therefore the amount of fluid which a given volume of the formation may contain depends directly upon its porosity. Although no earth substance is actually entirely solid, so-called "solid rock," formations composed of materials such as granite can generally be eliminated. On the other hand, layers of sandstone and other sedimentary formations usually warrant consideration.

Of course, porosity measurements alone do not furnish direct indications of the identity of the fluids reposing in formations. For this reason a method of well logging was devised wherein apparatus, which comprised a neutron source and a neutron detector, is passed through the borehole. In this situation, the source-emitted neutrons penetrate the borehole wall to bombard the surrounding substances, and the detector senses a representative number of those neutrons which have escaped capture and which have re-entered the borehole. It is well-known that "fast" neutrons easily penetrate substances composed mostly of the heavier elements, but that fast neutrons are readily slowed in velocity by substances composed of the lighter elements. Moreover, of all of the lighter elements, hydrogen is by far the most effective in slowing fast neutrons. Thus, if substantially fewer neutrons are detected when the detector is adjacent a particular formation, this will definitely indicate the presence of fluid at that level since practically all earth fluids are hydrogenous in composition. Variations of this measurement are widely used in the oil industry although, unfortunately, oil, salt water, and fresh water, all contain about the same amount of hydrogen and, therefore, are indistinguishable by this technique alone.

In general, colliding neutrons interact with nuclei of various materials either by "scattering" or by "capture." When a bombarding neutron collides with a nucleus, in the case of elastic scattering, the neutron ricochets off with the only result being at least a partial transfer of kinetic energy to the nucleus and a change in course for the neutron. No radiation results from this type of interaction. In the case of capture, however, the mass-energy of the resultant nucleus is in excess of its binding energy, and this excess is usually immediately given off in the form of gamma rays. It has been found that the energies of these gamma rays are characteristic of the bombarded nuclei, and therefore, in some well logging techniques a measurement of these energies is used to identify the substances bombarded.

The types of reactions which may occur as a result of neutron bombardment are both numerous and difficult to identify. However, it has been learned that the type of reaction depends in a large part upon the energies of the colliding neutron and nucleus and upon their relative masses. Thus, if a hydrogen atom, which has only a proton as its nucleus, is involved in the interaction the neutron may lose as much as 100% of its energy in the collision since a protron and a neutron have approximately the same mass. It has been determined that, on the average, a neutron will lose about 67% of its energy when colliding with the nucleus of a hydrogen atom, and therefore the average neutron will require very few collisions before being captured. On the other hand, if the collision involves a heavier substance such as carbon or oxygen, on the average the neutron will lose very little of its energy, and therefore will require many more collisions before being slowed to thermal energies. Insofar as their respective energies are concerned, neutrons are somewhat arbitrarily classified as "fast" (having energies greater than about 100 electron volts), "epithermal" (having energies of about 0.25 to 100 electron volts), and "thermal" (having energies less than about 0.25 electron volt).

It is well known that the probability that a particular nucleus will be struck by a neutron also depends not only upon the energy of the neutron but also upon the size of the nucleus. This probability is referred to as the "reaction cross section," and although it is not necessarily equal to the actual physical areas of the subject nucleus, it is expressed in terms of "barns." A "barn" is the dimensional equivalent of $10^{-24}$ cm.$^2$. The particular probability on "cross section" for various reactions has been determined for many of the elements in the atomic table. Of course, since the probability of a nuclear reaction also depends upon the energy of the bombarding neutron, the reaction cross section of a particular material will vary with the energy of the neutron.

Since, as hereinbefore stated, practically all of the naturally occurring liquids encountered by the borehole consist of either oil or water, and are therefore hydrogenous, the neutron capture cross section of hydrogen is very significant in well logging. Of course, a well logging measurement of the extent of hydrogen in the substances composing or occupying a particular formation cannot distinguish between oil and water, even if the porosity of the formation has been pre-determined, since hydrogen is about as abundant in water as it is in oil. Nonetheless the moderating effect of hydrogen upon a flux of neutrons is a significant phenomenon, and forms the basis of a great many radiological well logging measurements.

Chemically, oil may be distinguished from water by the fact that oil contains carbon and hydrogen but no oxygen, whereas water, whether fresh or saline, contains hydrogen and oxygen but no carbon. Thus it might be thought that, if the capture cross-section of carbon and oxygen were distinguishably different, this might furnish a basis for identification. However, the capture cross-section of both carbon and oxygen is negligible for thermal neutrons. Moreover, neither has a capture cross-section of appreciable magnitude for neutrons of any energy, as the term "capture" has been used herein, although various disintegration reactions may be obtained with fast neutron bombardment.

It is well known, however, that most of the subsurface water which is encountered at depths at which petroleum may be expected is saline rather than fresh. Thus, it was early recognized that the chlorine in the salt water might furnish a conclusive test of the character of a hydrogenous formation. One way to distinguish between oil and water is to measure the attenuating effect had by chlorine on a flux of neutrons, and compare this with a measurement of the moderating effect had thereon by the hydrogen. Several techniques employing neuclear measurements to detect chlorine have been developed by the petroleum industry and are now in use. Although some of these are indeed useful, the data they furnish is not conclusive as to the presence or absence of petroleum, and they must always be supplemented by lithological and other measurements. Among the more popular of the present nuclear logging techniques is one in which two preferably simultaneous measurements are made which consist of a conventional neutron-neutron log of the moderating effect of the hydrogen, and a special neutron-gamma log of the gamma rays produced by the capture of neutrons as hereinbefore described. The character of the capturing nucleus is indicated by the energy of the resulting gamma rays. Although bombarded chlorine nuclei emit gamma rays having a wide range of energies, spectral analysis has shown peaks of relatively high intensity at 6.12 mev. and 1.97 mev. energy levels. Theoretically, if the radiation detector used is sensitive only to gamma rays having these particular energies, the measurement obtained therewith would be indicative of the extent of the chlorine. However, it is obvious that the gammar rays may be substantially degraded in energy due to scattering within the formation and the borehole substances. Thus, it is not practical in actual well logging to restrict detection to such narrow limits, not only because of the energy loss due to scattering, but because of the limited resolution of presently available detectors. Of course, a discriminator trigger-level setting, which provides acceptance of pulses attributed to gamma rays of all energies greater than an energy such as 2 mev., will also include gamma rays resulting from neutron capture by other commonly occurring elements such as hydrogen, calcium, silicon, iron, and aluminum. Nevertheless, a comparison of a neutron-neutron log with a neutron-gamma log may provide a useful indication of chlorine, especially if associated with a lithological measurement, although the results are often inconclusive and are never quantitative.

These disadvantages of the prior art are overcome with the present invention, and novel methods and apparatus are provided which furnish a substantially conclusive determination of the presence and extent of chlorine in sub-surface formations.

The advantages of the present invention are preferably attained by making a so-called "thermal" neutron log of the substances surrounding a fluid-filled borehole, coreatively with an "epithermal" log thereof, and determining salinity by means of dissimilarities between the two logs. More particularly, apparatus containing a source of fast neutrons and a means for selectively detecting thermal and epithermal neutrons is passed through the borehole in a manner which provides a flux or cloud of neutrons in the surrounding substances. Assuming that the neutron source emission includes at least a substantial portion of fast neutrons, the substances will exercise a moderating effect thereon according to their chemical composition. The spatial distribution of the cloud of relatively slow neutrons, including both thermal and epithermal energies will depend primarily on the hydrogen in the substances, and a neutron detector positioned in the neighborhood of the source will produce an indication of hydrogen content. If the detection means is selectively sensitive to thermal neutrons, it will give the same general type of hydrogen indiction as if the detection means is selectively sensitive to epithermal neutrons. However these two detector means respond differently from one another when chlorine forms a substantial part of the surrounding substances. The neutron capture cross section of chlorine, for thermal neutrons, has been determined to be approximately 32,000 millibarns, whereas, for higher energy neutrons it decreases progressively with increasing neutron energy, and for neutrons of 1.0 electron volt energy the capture cross section has been estimated to be in the neighborhood of 13,000 millibarns. Thus, an epithermal neutron-neutron log, which involves detection of only neutrons having an energy sufficiently high that they are not likely to be captured by chlorine, is for practical well logging purposes insensitive to even a highly chlorinous substance; and therefore the dissimilarity between corelative thermal and epithermal neutron logs will furnish an indication of the presence and extent of chlorine in the formation fluid.

Of course, the penetrating neutrons emitted by the source tend to be slowed to some extent by any substance which may block their path. However, this tendency varies according to the constituency of the irradiated substance and affects both thermal and epithermal measurements to about the same extent. Thus, the purpose of the present invention is, in effect, to measure the number of neutrons which are "thermalized" (slowed to thermal energy) in the formations traversed by the borehole, and to compare this measurement with a corelative measurement of the number of neutrons which are merely "epithermalized" (slowed only to epithermal energies) in these formations. The value of the comparison, however, depends heavily upon the extent to which the two measurements are corelative, and therefore the advantage of the present invention includes the fact that it avoids borehole effect and other similar factors which tend to limit the accuracy and reliability of present well logging practices. Thus, in the present invention the well is preferably logged with apparatus which includes a source of fast neutrons and a de-centralized radiation detector preferentially sensitive to thermal neutrons. The measurement thus obtained is corelated with a measurement obtained with a similar detector which is displaced laterally, in the borehole, from the face of the borehole wall. The apparatus may include provision for shifting a single thermal neutron detector to at least two positions along the diameter of the borehole, or it may include one detector positioned adjacent the borehole wall and the other at a point displaced from the borehole wall and surrounded by the borehole fluids. The first detector will provide sampling of the source-emitted neutrons which are re-entering the borehole at thermal energy, and the second detector (or the first detector when shifted diametrically in the borehole) will sample those neutrons which re-enter at epithermal speeds but which are slowed by the hydrogenous borehole fluids to thermal energy before reaching the detector. The borehole fluids provide shielding, for both detectors, against direct irradiation by the source.

Accordingly, it is an object of the present invention to provide novel methods and apparatus for investigating the character of subsurface materials surrounding a borehole.

It is also an object to provide novel well logging methods and apparatus for distinguishing saline fluids in subsurface earth formations.

It is a further object of the present invention to provide novel methods and apparatus for measuring the moderating effect by subsurface formations on a flux of neutrons.

A specific object of the present invention is to provide a novel method of investigating substances surrounding a borehole comprising the steps of bombarding said substances with neutrons, detecting neutrons thermalized by said substances and neutrons epithermalized by said substances, establishing electrical signals indicative of said detected neutrons, and recording said signals corelatively with an indication of borehole depth.

Another specific object of the present invention is to provide novel apparatus for investigating substances surrounding a borehole, said apparatus comprising a source of neutrons, detecting means responsive to thermalized neutrons and epithermalized neutrons and producing electrical signals functionally related thereto, and means for recording said signals corelatively with an indication of borehole depth.

These and other objects and features of the present invention will be apparent from the following detailed description wherein reference is made to the figures of the accompanying drawings.

Figure 1:
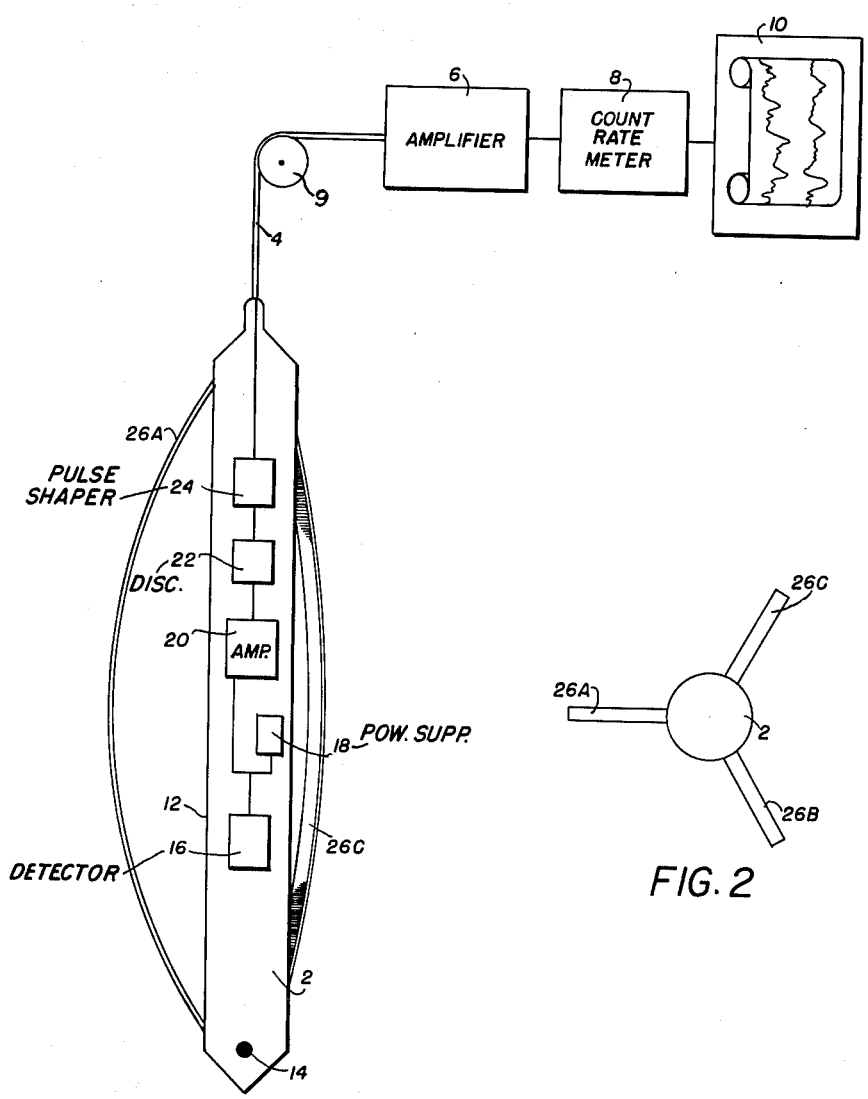
FIGURE 1 is a view of a radiological well logging instrument used in practicing the present invention.

In FIGURE 1 there is shown a pictorial representation of some of the essential details of one form of apparatus useful for the purposes of the present invention. Included therein is a subsurface logging instrument 2 adapted to be passed through a typical borehole by means of a cable 4. The instrument 2 generates and transmits by means of the cable 4 electrical pulses, to the surface-located measuring and recording equipment, which pulses are indicative of the character of the formations traversed by the borehole and the instrument 2. The surface equipment may include components such as an amplifier 6, a counting rate meter 8, and a recorder 10 for graphically displaying the pulses corelatively with an indication of the borehole depth at which the pulses are created. This depth indication may be derived from the operation of a measuring wheel 9, from which the cable 4 is suspended, and over which the cable 4 and instrument 2 is drawn by a means not shown in FIGURE 1. The measuring wheel 9 may be suspended in any convenient manner, such as by a traveling block suspended over the borehole by a derrick. The logging instrument 2 itself includes an elongated and pressure-resistant housing 12 containing at least one source 14 of fast neutrons, at least one radiation detector 16 which is preferably sensitive substantially only to thermal neutrons, and a voltage supply 18 of any type suitable to energize the detector 16. The source 14 may be a so-called "natural" source, such as an encapsulated mixture of beryllium and radium or polonium, or it may be an "artificial" source such as an ion beam accelerator of the type which employs the well-known reaction of deuterium and tritium. The detector 16, which is preferentially (though not necessarily) insensitive to gamma radiation, may be a $BF_3$ proportional counter, a scintillation counter employing a phosphor containing boron or lithium, a He–3 proportional counter, or generally any type of sensing apparatus which provides in response to incident thermal neutrons electrical pulses functionally related to the particles of incident radiation. These pulses may be fed to an amplifier 20, and thereafter through a discriminator 22 and a pulse shaping circuit 24 to the cable 4 for transmission to the surface equipment as hereinbefore explained.

Figure 2:
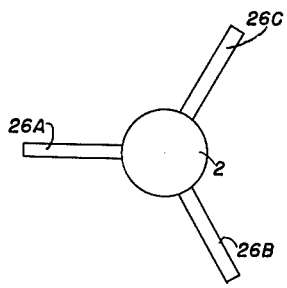
FIGURE 2 is another view of the instrument shown in FIGURE 1.

It is desirable for the purposes of the present invention that the logging instrument 2 be capable of positioning in respect to the borehole wall, since one of the primary objectives is to measure the number of thermal neutrons emanating from the face of the borehole compared to the number of epithermal neutrons emanating therefrom as a result of bombardment and penetration thereof by fast neutrons originated by the source 14. In FIGURE 1, the logging instrument 2 is therefore depicted with a centralizing bowspring assembly 26. FIGURE 2, which is provided for the purpose of showing a different view of the logging instrument 2, depicts this assembly 26 as comprising three bowsprings 26A, 26B, and 26C.

Figure 3:
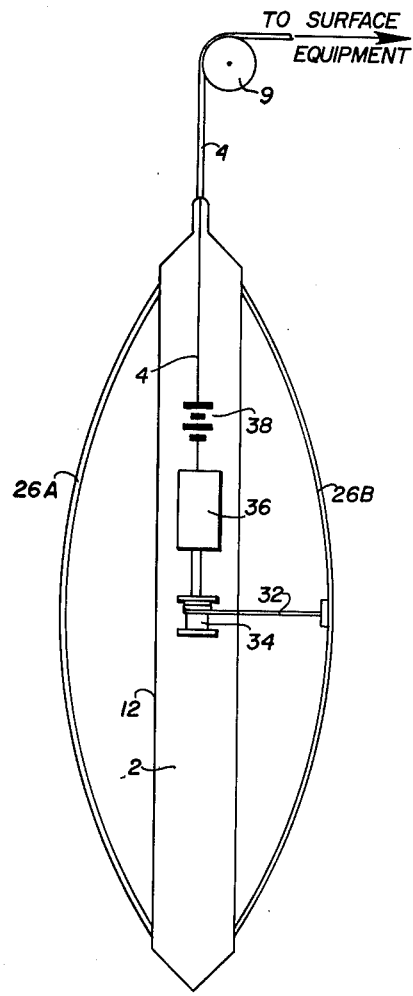
FIGURE 3 is another view of the internal components of the instruments shown in FIGURE 1.

FIGURE 3, which depicts another view of the logging instrument 2, shows one form of apparatus for achieving a controlled positioning of the instrument 2 in the borehole. Two of the bowsprings 26A and C (26C not appearing) are fixed on the instrument 2. However, bowspring 26B is capable of retraction since its apex is connected to a cable 32 which is, in turn, wound around a spool 34 mounted inside the housing 12 of the instrument 2. The spool 34 is driven or revolved, both clockwise and counter-clockwise, by a motor 36 or other driving means. The motor 36 may be energized by a power supply 38 located in the housing 12, and which is controlled at the surface of the earth by way of the cable 4, or the necessary power may be provided to the motor 36 from a unit (not shown) which is located at the surface of the earth. Thus, the position of the logging instrument 2 in the borehole may be varied at any time from centralized to de-centralized or from de-centralized to centralized.

Other modifications of apparatus may be used to selectively position the logging instrument 2 in the borehole. For example, finger-type levers may be substituted for the bowsprings 26A, 26B, and 26C. In addition, only two bowsprings 26A and 26B may be used, and the cable 32 which is attached to the apex of bowspring 26B, instead of terminating at the spool 34, may be continued to the apex of bowspring 26A. In such a case, if bowspring 26A is retracted when bowspring 26B is extended, the housing 12 may be alternately moved laterally from one side of the borehole to the other side of the borehole.

In neutron logging operations, it has heretofore been the practice to design logging equipment in a manner such that the effect of the fluids in the borehole, on the neutron flux provided by the source 14, can be minimized as much as possible. Unfortunately, since most such fluids are extremely hydrogenous, such designs have been largely ineffective for such a purpose. It is probable that no method (other than a complete bail-out of the borehole) will ever be devised by which neutron logging can be performed in a manner which will completely eliminate the effect of these fluids on logging measurements. The apparatus disclosed in the accompanying drawings, however, provides a neutron logging measurement which, to a considerable extent, is based on the neutron capturing and slowing capability of the borehole fluids, and is dependent in some cases on a comparison of this capability with the extent that the formation substances also possess this capability. Thus, when the logging instrument 2 is suspended at a particular level in the borehole, the fast neutrons emitted by the source bombard and penetrate the formation substances immediately adjacent thereto. As is well known in the art, the penetrating neutrons are scattered and slowed, or captured, depending upon the speed or energy possessed by the invidivual neutrons upon collision with the nuclei of the substances composing the formation, and depending upon the character (cross-section) of the nuclei. As is well known in the art, the number of neutrons emitted by the source 14 which fail to reach the face of the borehole wall depends, similarly, upon the cross-section of the fluid nuclei and the energy of the neutrons upon collision therewith. Since the fluids are substantially hydrogenous, or chlorinous, or both, they exert a considerable slowing effect upon fast neutrons, and achieve a high rate of capture of the slow and thermal neutrons. Thus, the borehole fluids act to eliminate or screen from the detector 16 those neutrons which are scattered in the borehole.

When the logging instrument 2 is decentralized in the borehole, the moderating effect of the fluids in the borehole is substantially eliminated, and if the detector 16 is insensitive to any but thermal neutrons, a measurement of the "thermalizing" effect of the formation substances can be obtained. However, as the instrument 2 is shifted laterally in the borehole away from the formation, and the moderating fluid becomes interposed increasingly between the detector 16 and the formation, a gradual change occurs in the rate at which the detector 16 senses thermal neutrons emitted from the formation. Insofar as the "cloud" (spatial distribution) of neutrons provided by the source 14 is concerned, it is always affected in extent and shape by the character of the substances disposed within and around the borehole. The instrument 2 itself always constitutes a severe anomaly in the distribution of the neutrons. If the detector 16 is primarily sensitive to radiation having a range which is small compared with the size of the borehole cross-section, the above-described variation, or "radial gradient," is very apparent. All types of detection apparatus will permit observation of this variation, but a thermal or slow neutron sensing device is particularly sensitive to its position, in the borehole, with respect to the proximity of the borehole wall. When a small diameter $BF_3$ counter is employed as the detector 16, it has been observed when the instrument 2 is centralized in the borehole that the counting rate may be either larger or smaller than when the instrument 2 is decentralized in the borehole. The counting rates obtained in both positions will depend, of course, upon the thermal neutron capturing characteristics of the formation, relative to the thermal neutron capturing characteristics of the borehole fluid (at that level). If this fluid is composed of fresh water, and if the adjacent formation is a porous sand saturated with fresh water, the recorder 10 may be normalized to produce a similar trace at both positions of the instrument 2 in the borehole. Then, if the formation fluid is changed to brine, the detector 16 will provide a lower counting rate, when the instrument 2 is decentralized, than when the instrument 2 is centralized. If the borehole fluid is brine, and the formation fluid is free of chlorine, the opposite result may be expected. Even if both the formation and borehole fluids are free from chlorine, the measurement described is very useful since it will provide a sensitive indication of the thermal neutron capturing properties of the formations encountered throughout the extent of the borehole. To one extent, at least, it may be considered to be a correlated thermal and epithermal neutron log of the borehole. This is based on the fact that, assuming the detector 16 to be preferentially sensitive to thermal neutrons, it will respond when surrounded by borehole fluid substantially only to those neutrons which are slowed in the formation to epithermal energies. If the neutrons are slowed to thermal energies in the formation, the borehole fluid will capture them. If, on the other hand, they enter the borehole with greater than epithermal energies, the detector 16 will not respond to them. Ideally, then, the detector 16 should be positioned, for the epithermal neutron measurement, in a manner such that those neutrons which are "epithermalized" in the formation, will be slowed in the borehole to thermal energy but will not be captured before reaching the detector 16. Under these circumstances it is often desirable, in order to emphasize this difference in counting rates, to dispose the detector 16 very close to the source 14 in order that the detector 16 may be substantially insensitive to counting rate variations produced by lithologic changes. Thus, it is sometimes preferable to dispose a second supply of fast neutrons on the opposite side of the detector 16 from the source 14 depicted in FIGURE 1.

Figure 4:
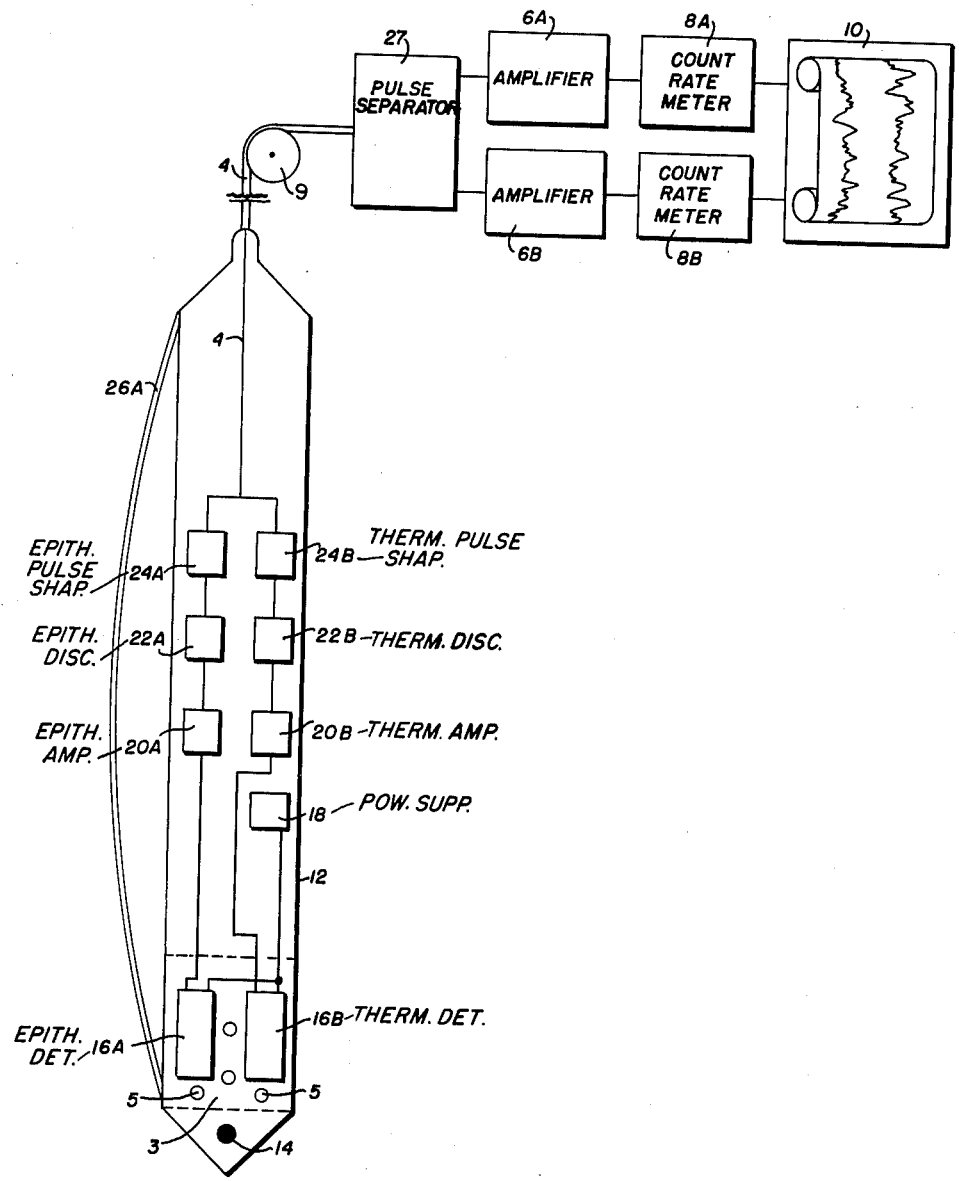
FIGURE 4 is a modification of the instrument depicted in the foregoing figures.

In some cases it is desirable to obtain both of the hereinbefore described measurements simultaneously. When so obtained, the ratio of the two measurements (at a common borehole depth) will be proportional to the thermal neutron flux gradient in the borehole. In FIGURE 4 there is depicted one type of apparatus which is useful for such a purpose. As shown, there is a single logging instrument 2 having a single source 14 of fast neutrons as hereinbefore described. However, instead of the single detector 16 depicted in FIGURE 1, there are preferably two thermal neutron detectors 16A and 16B. As hereinafter explained, detector 16A is arranged to respond to neutrons which are epithermalized in the formation and thermalized in the borehole, whereas detector 16B is arranged to respond to neutrons which are thermalized in the formation and which would, of course, be captured by the borehole fluids before bombarding the so-called "epithermal neutron" detector 16A.

Although both detectors 16A and 16B may be powered by a single voltage supply 18, it is preferable that their output signals be kept independent of each other. Thus, the pulses provided by the "epithermal neutron" detector 16A are passed to what may be called the "epithermal signal" amplifier 20A, the "epithermal signal" discriminator 22A, and the "epithermal signal" pulse shaping circuit 24A, before being applied to the cable 4 for transmission to the surface of the earth. On the other hand, the pulses provided by the "thermal neutron" detector 16B are passed to a separate circuitry which includes what may be termed the "thermal signal" amplifier 20B, the "thermal signal" discriminator 22B, and the "thermal signal" pulse shaping circuit 24B, before being applied to the cable 4. Since it is often desirable to limit the number of conductors composing the cable 4, the pulses emitted from the "epithermal signal" shaping circuit 24A may change in a manner such as shape or polarity, with respect to the pulses emitted by the "thermal signal" shaping circuit 24B, before the two groups of pulses are co-mingled on the cable 4. Thus, it may be desirable to transmit all pulses received at the surface of the earth to a pulse separator circuit 27 which will separate the pulses into two separate signals functionally related, respectively, to the two signals emitted, respectively, by the two shaping circuits 24A and 24B. Thus, the so-called "epithermal signal" amplifier 6A will receive "epithermal" pulses, and pass them through the so-called "epithermal" counting rate meter 8A before applying them to the recorder 10. Similarly, the "thermal" signal amplifier 6B will pass "thermal" pulses through the "thermal" counting rate meter 8B to the recorder 10. Both signals may be recorded, by the recorder 10, on a common recording strip having a common indication of borehole depth.

The housing 12A depicted in FIGURE 4, differs from the housing 12 shown in FIGURE 1, in that the part which surrounds the detectors 16A and 16B is made hollow and is provided with openings 5 which permit entry of the borehole fluids. Further, the housing 12A is equipped with only two bowsprings 26A and 26B (26B not appearing in FIGURE 4) which are preferably arranged to urge the "thermal neutron" detector 16B in the direction of the wall of the borehole, and to urge or dispose the "epithermal neutron" detector 16A in the direction of the axis of the borehole. When the instrument 2 is disposed in the borehole, the fluids which enter the aforementioned hollow part of the housing 12A, will serve the screening function hereinbefore described. In some cases it may be preferable to fill the hollow part with a hydrogenous substance such as paraffin, rather than to utilize the moderating capabilities of the borehole fluid.

Figure 5:
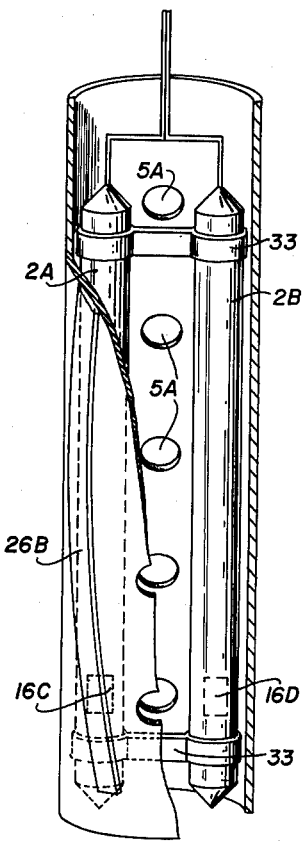
FIGURE 5 is another form of apparatus useful in practicing the present invention.
Figure 6:
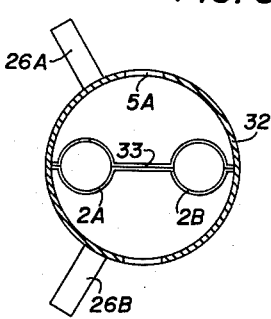
FIGURE 6 is another view of the apparatus depicted by FIGURE 5.

In FIGURE 5 and FIGURE 6 are two views of a modification of the apparatus depicted in FIGURE 4, wherein two small diameter instruments 2A and 2B, which are similar in construction to the instrument 2 shown in FIGURE 1 (but without bowsprings), are connected rigidly by clamps 33 and disposed in a hollow holder 32. This holder 32, which is formed in the manner of a casing or shell, has wall apertures 5A which are similar in form and purpose to the openings 5 depicted in FIGURE 4. The holder 32 is also equipped with bowsprings 26A and 26B which are arranged to urge detector 16D in the direction of the borehole wall, and to urge or direct detector 16C in the direction of the borehole axis.

If two such corelated measurements are obtained, one with a "centralized" detector and the other with a "decentralized" detector, anomalies resulting from borehole shape or diameter variation will be similar in both measurements and therefore may be disregarded when the difference between the two measurements is the real objective of the logging operation. In addition to what has hereinbefore been described, the apparatus may include provision for simultaneously obtaining a corelative measurement of the gamma radiation resulting from neutron capture. An increase in salinity may be expected to manifest itself by an increase in the gamma ray counting rate, relative to the neutron counting rate which may show no change, or which may in fact decrease.

Numerous other modifications and variations may obviously be made without departing from the scope of the present invention. Accordingly, it should be clearly understood that the forms of the invention described above and shown in the figures of the accompanying drawings are illustrative only and are not intended to limit the scope of the invention.

What is claimed is:

1. Apparatus for investigating subsurface substances surrounding a borehole, said apparatus comprising a source of fast neutrons suspended in said borehole, detecting means responsively producing electrical signals functionally related to incident thermal neutrons and spaced a pre-selected distance in said borehole from said source, means for selectively exposing said detecting means preferentially to neutrons thermalized in said surrounding substances and preferentially to neutrons thermalized in substances within said borehole, and means for comparatively recording said signals corelatively with an indication of borehole depth and with an indication of the exposure selected.

2. Apparatus for investigating subsurface substances surrounding a borehole, said apparatus comprising a source of fast neutrons, detecting means responsive to thermal neutrons and producing electrical signals functionally related thereto, means for selectively exposing said detecting means preferentially to neutrons thermalized in said surrounding substances and preferentially to neutrons thermalized in substances within said borehole, and means for recording said signals together with an indication of borehole depth.

3. Apparatus for investigating subsurface substances surrounding a borehole, said apparatus comprising a source of fast neutrons suspended in said borehole, detecting means responsive to thermal neutrons incident thereon and producing electrical signals functionally related thereto, said detecting means being spaced from said source a pre-selected distance axially of said borehole, means for selectively exposing said detecting means preferentially to neutrons thermalized in said surrounding substances and preferentially to neutrons thermalized in substances within said borehole, and means for recording said signals together with an indication of borehole depth and with an indication of the selected exposure.

4. Apparatus for investigating subsurface substances surrounding a borehole, said apparatus comprising a source of fast neutrons suspended in said borehole, detecting means responsive to thermal neutrons incident thereon and producing electrical signals functionally related thereto, said detecting means being spaced from said source a pre-selected distance axially of said borehole, means for exposing said detecting means preferentially to neutrons thermalized in said surrounding substances and preferentially to neutrons thermalized in substances within said borehole, and means for recording said signals together with an indication of borehole depth.

5. In an apparatus for surveying a borehole, said apparatus including a source of fast neutrons, the improvement in combination therewith comprising a radiation detector adapted to provide in response to incident thermal neutrons a signal composed of electrical pulses functionally related to said incident neutrons, housing means supporting said detector in relatively close proximity to said source and adapted to permit substantial envelopment of said detector by substances in said borehole when said detector is in a displaced position with respect to the wall of said borehole, means for selectively positioning said housing such that said detector is located adjacent said borehole wall and such that said detector is displaced from said wall diametrically with respect to said borehole, and means interconnected with said detector for providing with a corelative indication of borehole depth a graphic display of a pre-selected function of the magnitude of response of said detector when said detector is located adjacent said wall at a particular borehole depth and when said detector is displaced from said wall at said particular depth.

6. In an apparatus for surveying a borehole, said apparatus including a source of fast neutrons, in combination therewith the improvement comprising a radiation detector adapted to generate in response to incident thermal neutrons electrical pulses functionally related to said incident neutrons, housing means supporting said detector in close proximity to said source and adapted to selectively expose said detector to neutrons entering said borehole at thermal energy and to neutrons entering said borehole at epithermal energies and thereafter slowed to thermal energy by the substances in said borehole, and means interconnected with said detector for providing with a corelative indication of depth a pre-selected function of the magnitude of the response of said detector to said neutrons entering said borehole at thermal energy and the magnitude of the response of said detector to said neutrons entering said borehole at epithermal energies.

7. In an apparatus for surveying a borehole, said apparatus including at least one source of fast neutrons, in combination therewith the improvement comprising a first radiation detector adapted to produce a first electrical signal composed of pulses functionally related to thermal neutrons incident on said first detector, a second radiation detector adapted to produce a second electrical signal composed of pulses functionally related to thermal neutrons incident of said second detector, housing means for supporting said first and second detectors in close proximity to said source in a manner such that when said housing means is positioned in said borehole said first detector is disposed adjacent the wall of said borehole and said second detector is disposed laterally from said first detector adjacent the center of said borehole and in contact with the substances contained in said borehole, and means interconnected with said first and second detectors and providing with a corelative indication of borehole depth a recorded measurement of a pre-selected function of the magnitudes of said first and second signals.

8. In an apparatus for investigating the character of substances in and around a borehole, said apparatus including a source of neutrons, the improvement in combination therewith comprising a radiation detector preferentially responsive to thermal neutrons, housing means supporting said detector in fixed relationship to said source and adapted to permit substantial envelopment of said detector by the substances in said borehole when said detector is in a displaced position with respect to the wall of said borehole, means for diametrically positioning said detector with respect to said borehole, and means interconnected with said detector for providing with a corelative indication of borehole depth a graphic display of a pre-selected function of the magnitude of the response of said detector at different diametric positions.

9. In an apparatus for investigating the character of substances in and around a borehole said apparatus including a source of neutrons, the improvement in combination therewith comprising means for sensing thermal neutrons at a plurality of diametrically located points in said borehole, and means interconnected therewith for recording corelatively with an indication of borehole depth a pre-selected function of the magnitude of said thermal neutrons sensed at said points.

References Cited by the Examiner
UNITED STATES PATENTS

| | | | |
|---|---|---|---|
| 2,873,377 | 2/59 | McKay | 250—43.5 |
| 2,934,652 | 4/60 | Caldwell et al. | 250—83.6 |
| 2,971,094 | 2/61 | Tittle | 250—83.6 X |

RALPH G. NILSON, *Primary Examiner.*